United States Patent [19]
Maruyama

[11] Patent Number: 5,398,188
[45] Date of Patent: Mar. 14, 1995

[54] NAVIGATION APPARATUS AND METHOD FOR A VEHICLE FOR DISPLAYING POSITIONAL INFORMATION OF THE SAME

[75] Inventor: Koji Maruyama, Hyogo, Japan

[73] Assignee: Mitsubishi Denki Kabushiki Kaisha, Tokyo, Japan

[21] Appl. No.: 986,561

[22] Filed: Dec. 7, 1992

[30] Foreign Application Priority Data

Dec. 9, 1991 [JP] Japan ................. 3-324464

[51] Int. Cl.⁶ ............................. G06F 15/50
[52] U.S. Cl. ................... 364/449; 364/450; 340/995
[58] Field of Search ........... 364/443, 449, 450, 452, 364/460; 340/995; 342/357, 457; 395/153, 157

[56] References Cited

U.S. PATENT DOCUMENTS

| | | | |
|---|---|---|---|
| 4,675,676 | 6/1987 | Takanabe et al. | 340/995 |
| 5,031,104 | 7/1991 | Ikeda et al. | 364/449 |
| 5,041,982 | 8/1991 | Rathnam | 364/443 |
| 5,179,519 | 1/1993 | Adachi et al. | 364/449 |

FOREIGN PATENT DOCUMENTS 0261404  8/1987  European Pat. Off. .
59-216016 12/1984  Japan .
246086 of 1990  Japan .

OTHER PUBLICATIONS

Japanese Printed Publication 61-181,914 (A). In: Patents Abstracts of Japan, P-532, Jan. 6, 1987, vol. 11/No. 2.

Primary Examiner—Michael Zanelli

[57] ABSTRACT

A navigation apparatus used in a vehicle and associated display method are designed to spot the current position of the vehicle on maps displayed in a base field and a window field of a display screen. The apparatus includes a memory for storing map information and sensors for detecting the position and moving direction of the vehicle. A portion of the map information is retrieved from the memory in accordance with the sensor outputs and displayed in the base field such that certain azimuth, e.g., the north, faces upward. Another portion of the map information is retrieved from the memory and displayed in the window field such that the moving direction faces upward.

32 Claims, 6 Drawing Sheets

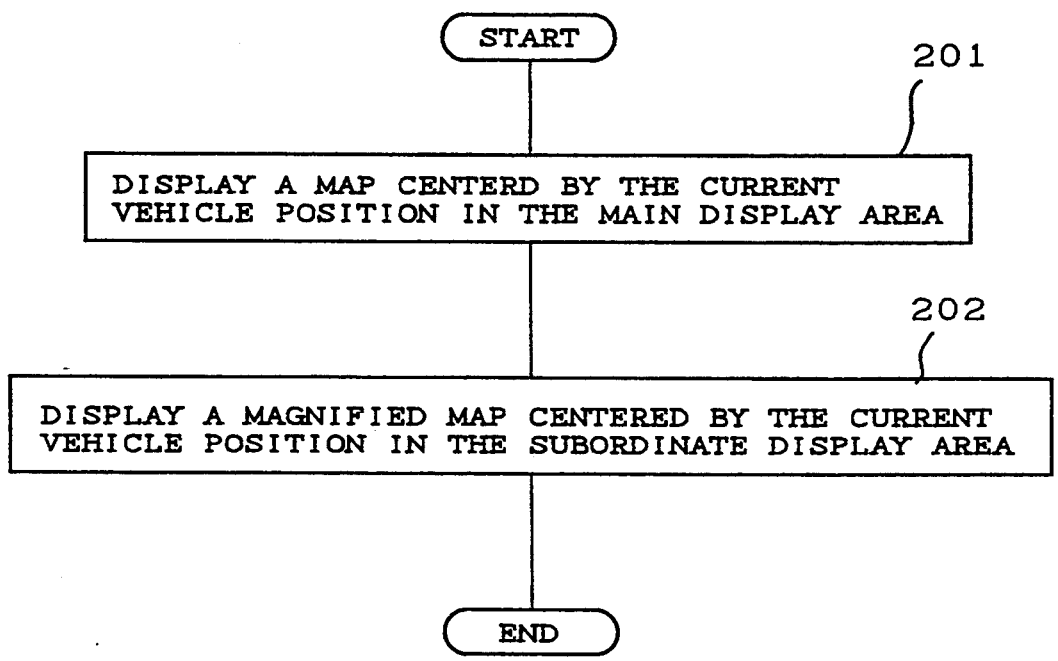

NAVIGATION APPARATUS AND METHOD FOR A VEHICLE FOR DISPLAYING POSITIONAL INFORMATION OF THE SAME

BACKGROUND OF THE INVENTION

1. Field of the Invention

The present invention relates to a navigation apparatus for a vehicle and an associated display method for displaying the current vehicle position in a base field and a window field formed on a display screen.

2. Description of the Prior Art

FIG. 6 shows in block diagram an example of conventional navigation apparatus disclosed in Japanese Patent Publication No. 2-46086, and FIG. 7 shows the screen of a CRT (cathode ray tube) display unit on which maps and other navigational information are displayed.

In FIG. 6, the apparatus installed in a vehicle includes a CRT (cathode ray tube) display unit 1 as a display means, a ROM (read-only memory) package 2 for storing map data, a manual operation panel 3, an electronic controller 4 which performs the map display control and the like, an azimuth sensor 10 which detects a direction of movement of the vehicle, and a distance sensor 11 which measures a running distance of the vehicle. The electronic controller 4 consists of an MPU (microprocessing unit) 5, a ROM 6, a RAM (random access memory) 7, an I/O (input/output) unit 8, a display controller 9 which controls the CRT 1. In FIG. 7, the display screen consists of a main display area 1a and a subordinate display area 1b.

Next, the operation 4 of this navigation apparatus related to the present invention will be explained on the flowchart of FIG. 8 which shows the steps of operation after the apparatus has been turned on.

In step 201, the controller 4 displays a map centered by the current vehicle position in the main display area 1a of the display screen shown in FIG. 7 and spots a mark at the current vehicle position. In step 202, the controller 4 displays a magnified detailed map including the current vehicle position in the subordinate display area 1b in the same azimuth orientation as the map of the main display area 1a.

As the vehicle moves, the vehicle position marks move on the maps which are fixed in the display areas. When the vehicle goes out of the map range of the subordinate display area 1b, the displayed map is revised so that the current vehicle position is located at the center of the subordinate display area 1b.

Maps are displayed, with the north always facing upward, and therefore the driver of the vehicle is liable to confuse in making a right turn or a left turn, except when the vehicle is running upwardly on the screen. On the other hand if maps are displayed, with the vehicle moving direction facing upward, it would be difficult for the driver who is accustomed to north up-facing maps to recognize the current vehicle position on the displayed map.

SUMMARY OF THE INVENTION

An object of this invention is to provide a navigation apparatus and associated display method capable of enabling the vehicle driver to make easy recognition of the current vehicle position and make easy judgment of the turn direction.

In order to achieve the above object, the navigation apparatus used in vehicle of the present invention comprises means for storing map information which covers at least a range of movement of the vehicle, location means for detecting a position and moving direction of the vehicle, base field display means for extracting first information from the map information based on the vehicle position and moving direction detected by the location means and displays the first information in a first screen section such that a predetermined azimuth faces upward, and window field display means which extracts second information from the map information based on the vehicle position detected by the location means and displays the second information in a second screen section such that the moving direction faces upward.

The displaying method of the navigation apparatus used in a vehicle of the present invention comprises a step of detecting the position and moving direction of the vehicle, a step of extracting first information from the map information based on the detected vehicle position and moving direction and displaying the first information in the first screen section such that a predetermined azimuth faces upward, and a step of extracting second information from the map information based on the detected vehicle position and displaying the second information in the second screen section such that the moving direction faces upward.

The map information displayed by the window field display means has its upward direction assigned to the vehicle moving direction, while the map information displayed by the base field display means has its upward direction assigned to the north as in the case of ordinary maps, whereby the vehicle driver can easily recognize the current vehicle position and, at the same time, easily determine the heading of the vehicle.

BRIEF DESCRIPTION OF THE DRAWINGS

FIG. 8 is a flowchart showing the operation of the electronic controller of the conventional navigation apparatus.

DETAILED DESCRIPTION OF THE PREFERRED EMBODIMENTS

Embodiments of the present invention will be described in detail with reference to the drawings.

Embodiment 1

Figure 1:
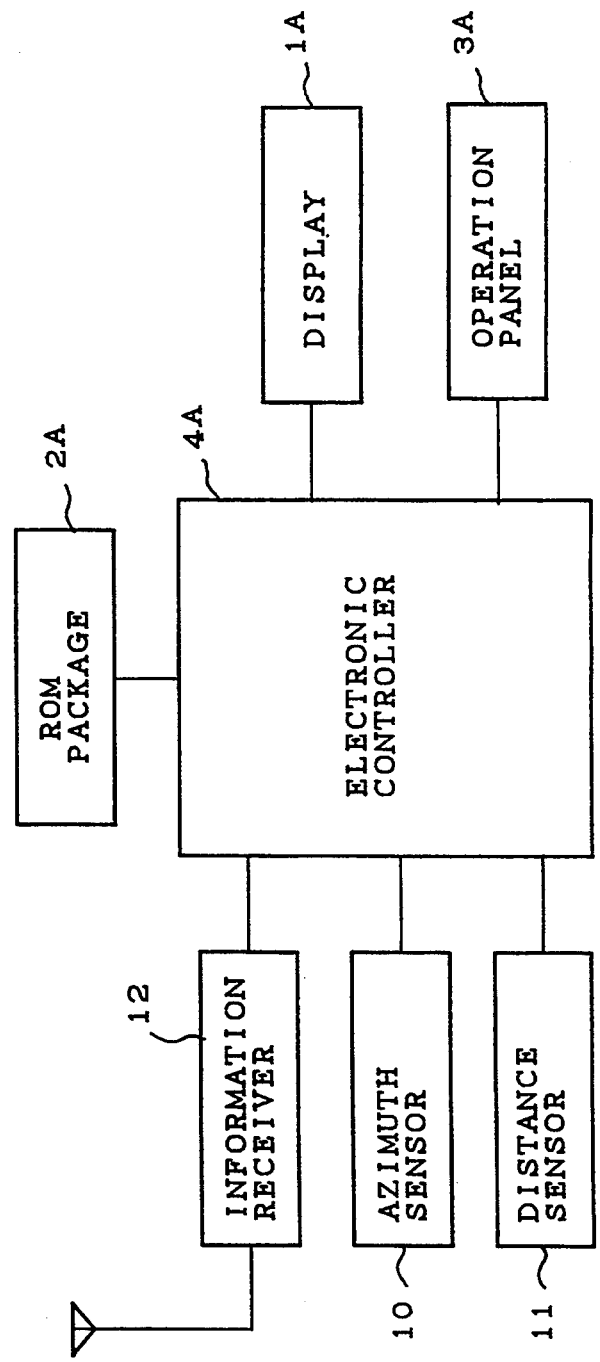
FIG. 1 is a block diagram of the navigation apparatus based on an embodiment of this invention.
Figure 2:
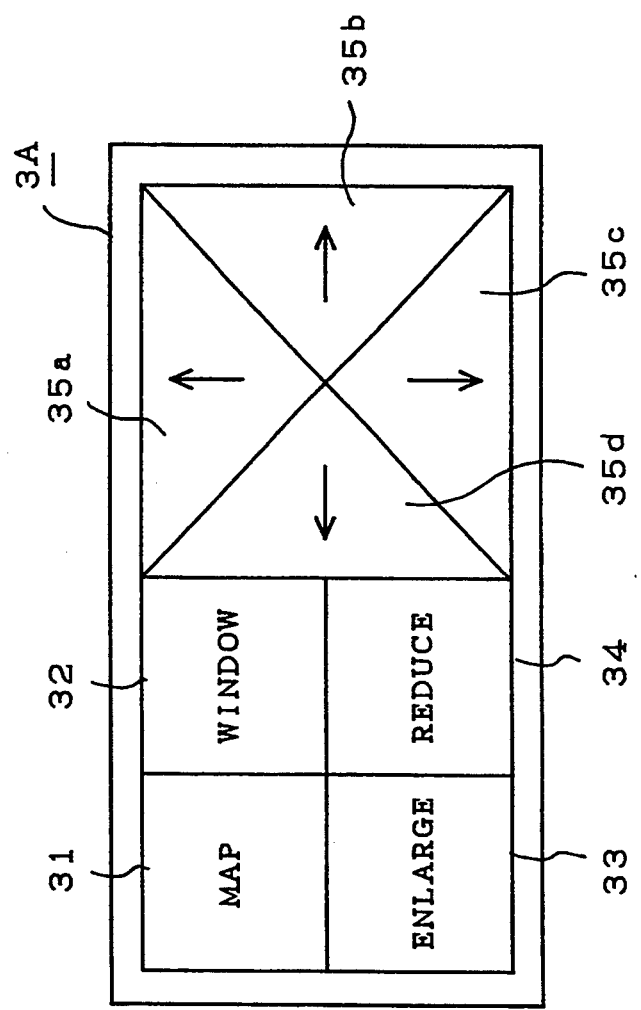
FIG. 2 is a diagram showing the top view of the manual operation panel of this navigation apparatus.

FIG. 1 shows in block diagram the navigation apparatus based on an embodiment of this invention, and FIG. 2 shows the top view of the manual operation panel of the apparatus.

In FIG. 1, symbol 1A denotes a display unit having a CRT or an LCD screen for displaying a map in a base field and a magnified map in a window field that is formed in a part of the base field and spotting marks indicative of the current vehicle position on the maps of both fields, 2A is a ROM package which stores map data of the whole country, and 3A is a manual operation panel which produces instruction signals by being operated by the vehicle driver.

Indicated by 4A is an electronic controller which locates the current vehicle position and controls the map display operation, 10 is an azimuth sensor which detects the moving direction of the vehicle, 11 is a distance sensor which measures a running distance of the vehicle, and 12 is an information receiver which receives the positional information of the vehicle provided by an external facility.

The electronic controller 4A, which is connected to the display unit 1A, ROM package 2A, operation panel 3A, azimuth sensor 10, distance sensor 11 and receiver 12, includes a ROM which stores operational programs, an MPU which carries out the general process in accordance with the programs stored in the ROM, and a RAM which provides working memory areas for the process of the MPU. The operational programs are designed to detect a position and a moving direction of the vehicle, display navigational information in the base and window fields, extract display information from the ROM package 2A, and receive signals from the operation panel 3A.

In FIG. 2, the operation panel 3A includes a map switch 31 used to instruct the controller to display a map, a window switch 32 used to form the window field, a magnification switch 33 used to instructed the controller 4A to magnify the map, a reduction switch 34 used to instruct the controller 4 to reduce the map, and a set of scroll switches 35a, 35b, 35c and 35d used to scroll the map in the upward, downward, leftward and rightward directions. The electronic controller 4A implements the detection of the current vehicle position. In this case, the distance sensor 11 which counts wheel rotation pulses for example and the azimuth sensor 10 which is a terrestrial magnetism sensor, gyroscope or the like provide rough data of the vehicle position, and the controller 4A modifies the data by making reference to the road data stored in the ROM package 2A so that cumulative errors of the sensors are eliminated. By receiving the absolute coordinate data provided by the beacon system or GPS (global positioning system) with the information receiver 12, more accurate vehicle position can be revealed.

Figure 3:
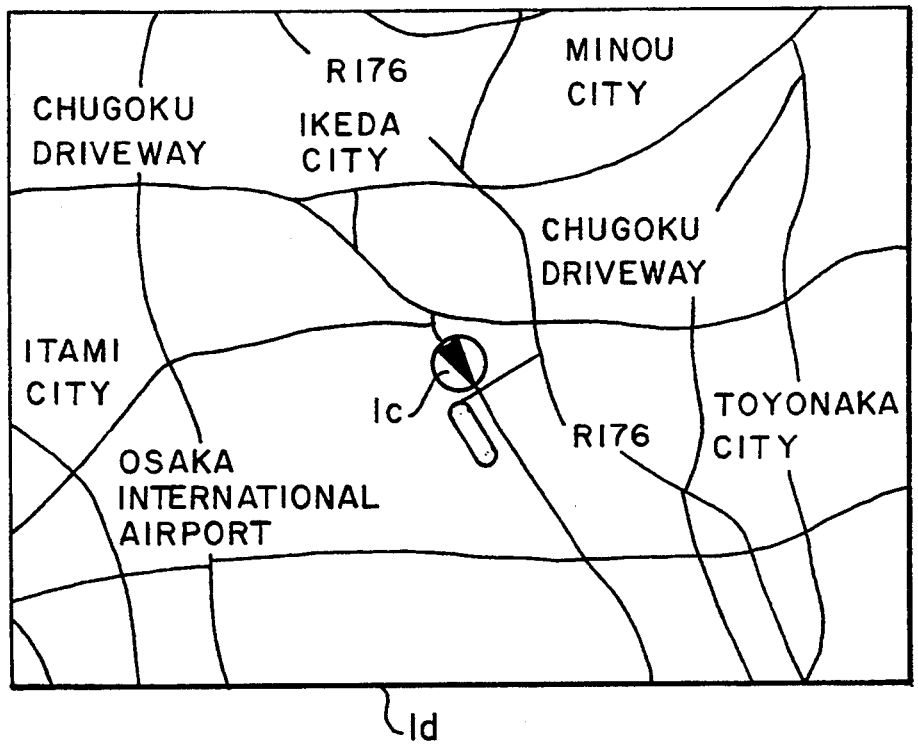
FIG. 3 is a diagram showing an example of display based on this embodiment.

Next, the operation of this embodiment will be explained. A vehicle position mark, which is shaped to indicate the moving direction of the vehicle as shown by 1c in FIG. 3, is spotted on the map which is displayed on the display unit 1A.

Figure 4:
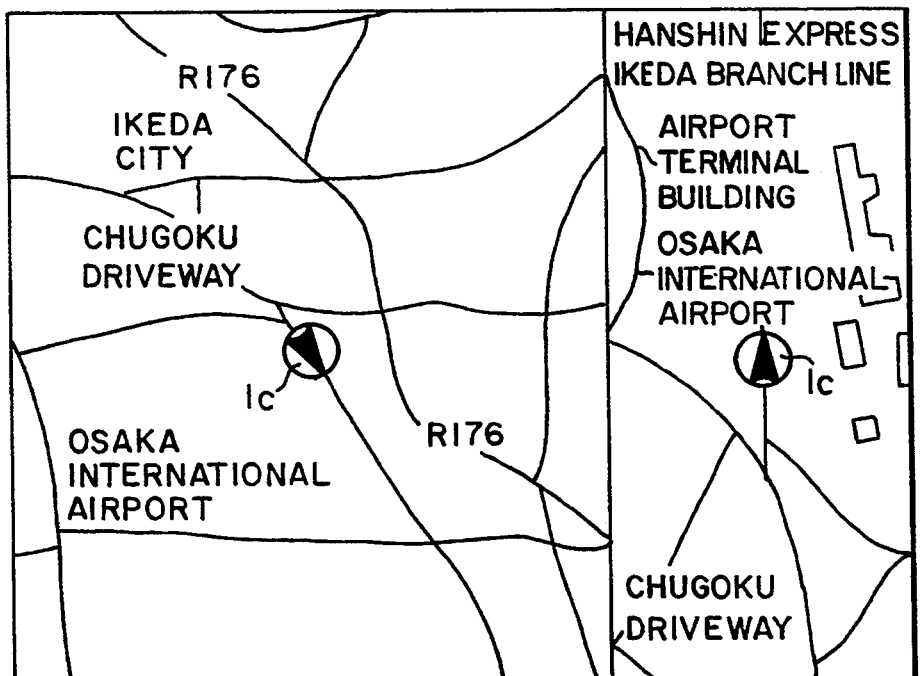
FIG. 4 is a diagram showing another example of display based on this embodiment.

When a vehicle is running in an area where the driver does not know the geographical features well, it is generally necessary for the driver to know the current vehicle position on a map displayed with the north facing upward and find the next turning point near the current position. In this situation, when the driver presses the window switch 32, a rectangular base field 1f and window field 1e are formed as shown in FIG. 4. Displayed in the base field 1f is a map, with the north facing upward, and displayed in the window field 1e is a magnified map for a portion of the map in the base field 1f, with the vehicle moving direction facing upward. The vehicle position mark 1c is spotted at the current vehicle position on both maps.

Figure 5:
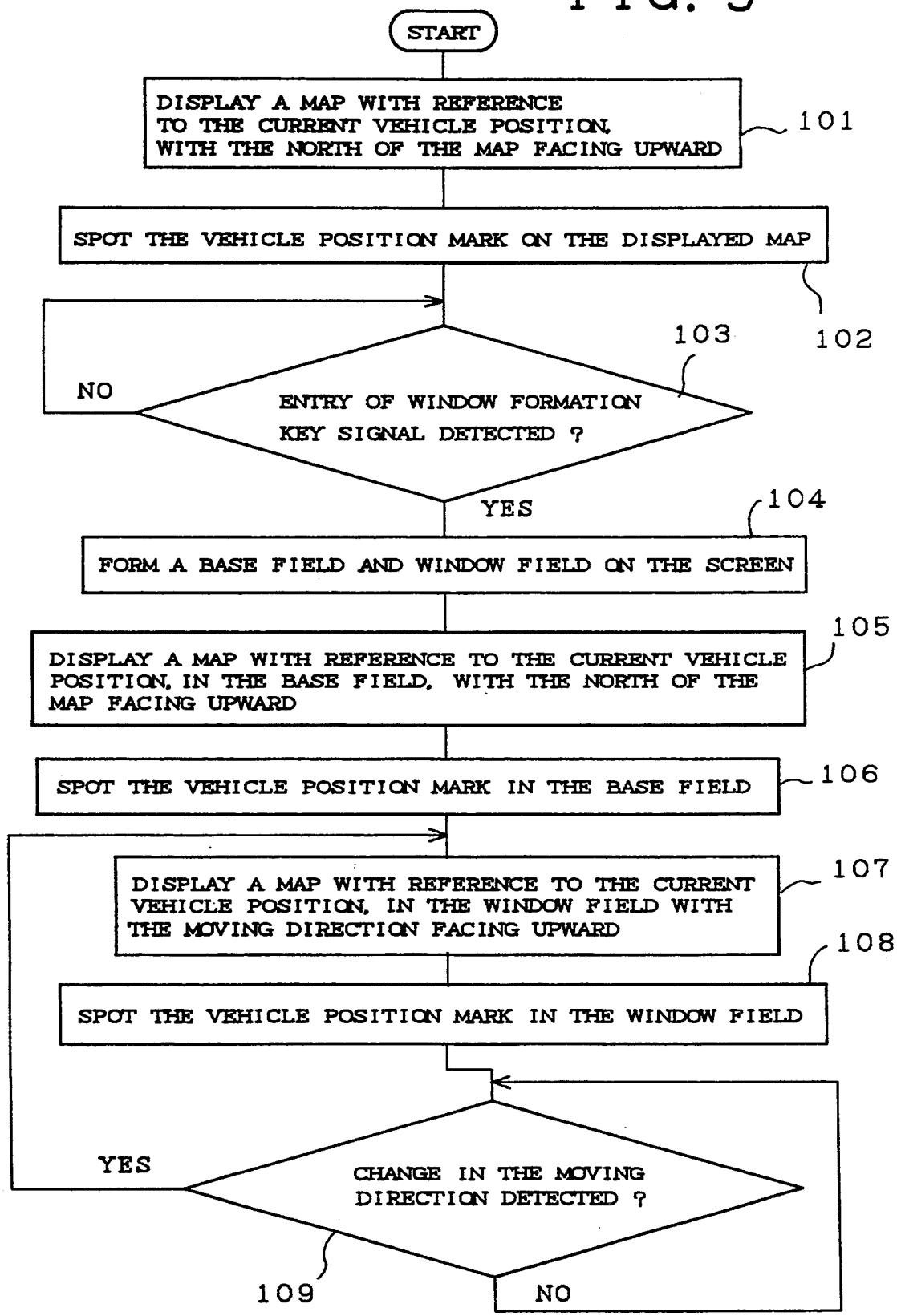
FIG. 5 is a flowchart showing the operation of the electronic controller included in this embodiment.
Figure 6:
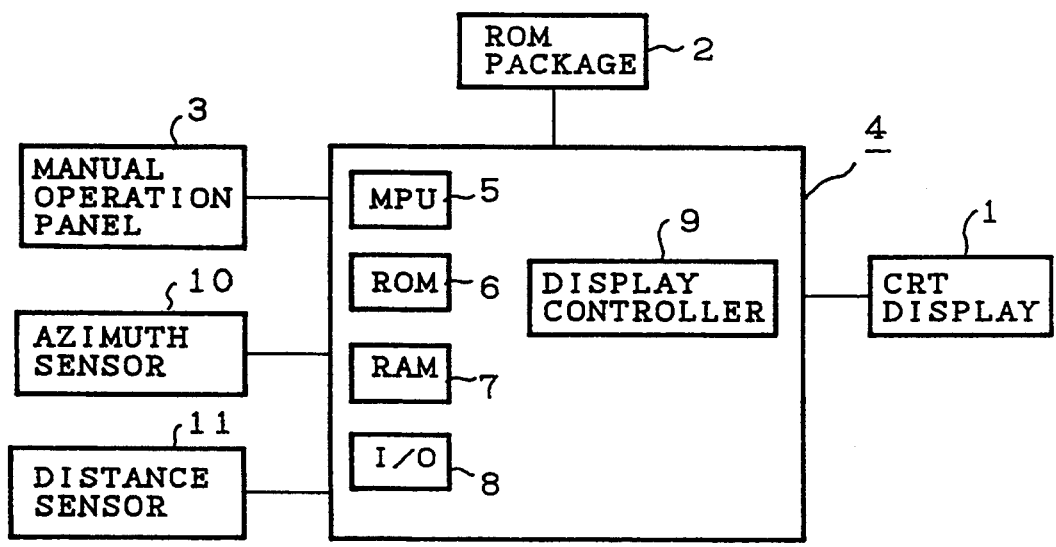
FIG. 6 is a block diagram of the conventional navigation apparatus.
Figure 7:
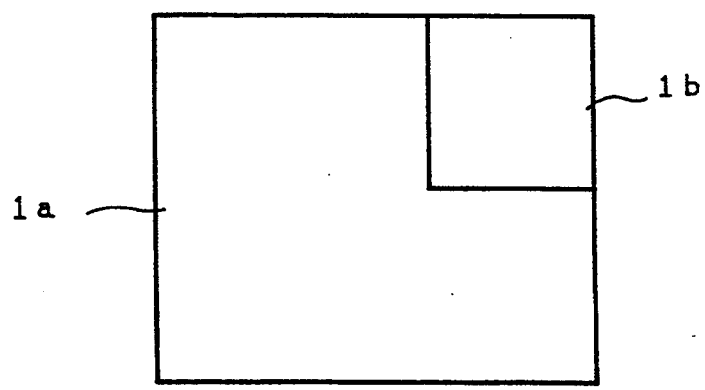
FIG. 7 is a diagram showing the display screen of the conventional navigation apparatus.

The operation will further be explained in connection with the flowchart of FIG. 5.

In step 101, map data is read out of the ROM package 2A in accordance with the current vehicle position which has been determined by the electronic controller 4A based on the outputs of the azimuth sensor 10, distance sensor 11 and receiver 12, and a map is displayed in the base field 1d of the display unit 1A, with the north facing upward, under control of the electronic controller 4A. In step 102, the vehicle position mark 1c is spotted on the map of the base field 1d.

In step 103, the entry of the window switch 32 is monitored, and, in response to the switch signal, the control sequence proceeds to step 104, in which a base field 1f and window field 1e are established on the screen of the display unit 1A. In the subsequent step 105, a north up-facing map is displayed based on the current vehicle position in the base field 1f, and in step 106, the vehicle position mark 1c is spotted on the map in the base field 1f.

In step 107, a magnified map for a portion of the map in the base field 1f is displayed in the window field 1e, with the vehicle moving direction facing upward. In this case, if there is detailed road information in the ROM package 2A, it is read out and displayed in the window field 1e. In step 108, the vehicle position mark 1c is spotted on the map in the window field 1e.

In step 109, a change in the vehicle moving direction is monitored, and, on detecting it, the control sequence returns to step 107.

Embodiment 2

This embodiment relates to the shape of the window field. The rectangular window field of the first embodiment is replaced with a circular window field or a field of other shape.

Embodiment 3

This embodiment relates to the display mode of the window field. The location and size of the window field in the display screen, which are fixed in the first embodiment, is made manually variable through the provision of switches or the like on the operation panel.

Embodiment 4

This embodiment relates to the display position of the vehicle position mark. The vehicle position mark, which is spotted at a central portion of the base field and window field in the first embodiment, is spotted at other portion through the manual operation on the operation panel.

Embodiment 5

This embodiment relates to the setting of the scale factor of a map displayed in the window field. The scale factor of a map in the window field, which is fixed in the first embodiment, is made arbitrarily variable through the manual operation on the operation panel.

Embodiment 6

This embodiment relates to the orientation of maps displayed in the base field and window field. Although a map displayed in the base field has its upward direction assigned to the north and a map displayed in the window field has its upward direction assigned to the vehicle moving direction, these map orientation modes is made interchangeable between the base and window fields through the manual operation on the operation panel.

Embodiment 7

This embodiment relates to the display screen where the base field and window field are formed. The base field and window field, which are formed in the same display screen in the first embodiment, are formed in separate screens of different display units.

Embodiment 8

This embodiment relates to the manual operation of the apparatus. Although in the first embodiment the manual operation uses the operation panel including mechanical switches, it is replaced with touch sensors provided on the display screen so that operator's instructions are entered through the touch of specific portions of the screen.

According to these embodiments of invention, the vehicle driver can easily recognize the current position by viewing a north up-facing map displayed in the base field of the screen spotted by the vehicle position mark, and can easily determine the turn direction by viewing a magnified map displayed in the window field, with the moving direction facing virtually upward, spotted by the vehicle position mark.

Although in the foregoing embodiments the upward direction of the base field is assigned to the north, it may be replaced with any of the south, east and west.

What is claimed is:

1. A navigation apparatus used in a vehicle for displaying positional information of said vehicle on a display screen, said apparatus comprising:
    means for storing map information which covers at least a range of movement of said vehicle;
    means for detecting a position and moving direction of said vehicle;
    base field display means for extracting first information from said map information based on the position and moving direction of said vehicle detected by said detecting means, and displaying said first information on a base field of said display screen such that a predetermined azimuth of said map information faces upward;
    a switch used to instruct a formation of a window field in a part of said display screen;
    means for instructing a shape of said window field; and
    window field display means for extracting second information from said map information based on the position of said vehicle detected by said detecting means, when said switch is operated, and for displaying said second information in said instructed shape on the window field of said display screen such that the moving direction faces upward.

2. A navigation apparatus according to claim 1, wherein said position and moving direction detecting means comprises an azimuth sensor for detecting the moving direction of said vehicle and a distance sensor for measuring a running distance of said vehicle, said position and moving direction detecting means determining the position and moving direction of said vehicle based on a result of detection of said azimuth sensor and a result of measurement of said distance sensor.

3. A navigation apparatus according to claim 1, wherein said position and moving direction detecting means comprises means for receiving positional data provided by an external facility indicative of an absolute coordinates of said vehicle, said position and moving direction detecting means determining the position and moving direction of said moving body based on the positional data received by said receiving means.

4. A navigation apparatus according to claim 1, wherein said position and moving direction detecting means comprises an azimuth sensor for detecting a moving direction of said vehicle and a distance sensor for measuring a running distance of said vehicle, said position and moving direction detecting means determining the position and moving direction of said vehicle through a map matching process between results of detection of said azimuth and distance sensors based on said map information.

5. A navigation apparatus according to claim 1, wherein said base field display means spots a mark of the current position of said vehicle in said base field.

6. A navigation apparatus according to claim 5, wherein said base field display means indicates the moving direction of said vehicle at the current position in said base field.

7. A navigation apparatus according to claim 1, wherein said window field display means spots a mark of the current position of said moving body in said window field.

8. A navigation apparatus according to claim 7, wherein said window field display means indicates the moving direction of said vehicle at the current position in said window field.

9. A navigation apparatus according to claim 1, wherein said predetermined azimuth is the north.

10. A navigation apparatus according to claim 1, wherein said window field display means displays said second information in said window field in accordance with a scale factor which is greater than that of said first information which is displayed in said base field.

11. A navigation apparatus according to claim 1, wherein said base field display means displays said first information such that the current position of said moving body is located virtually at the center of said base field.

12. A navigation apparatus according to claim 1, wherein said window field display means displays said second information such that the current position of said moving body is located virtually at the center of said window field.

13. A navigation apparatus according to claim 1 further including a field interchanging switch, and means of interchanging contents of said base field and said window field in response to an activation of said switch so that said first information is displayed in said window field and said second information is displayed in said base field.

14. A navigation apparatus used in a vehicle for displaying positional information of said vehicle on a display screen, said apparatus comprising:
    means for storing map information which covers at least a range of movement of said vehicle;
    means for detecting a position and moving direction of said vehicle;
    base field display means for extracting first information from said map information based on the position and moving direction of said vehicle detected by said detecting means, and displaying said first information on a base field of the display screen such that a predetermined azimuth of said map information faces upward;

a switch used to instruct a formation of a window field in a part of the display screen;

window field display means, when said switch is pressed, for extracting second information from said map information based on the position of said vehicle detected by said detecting means, and for displaying said second information in said window field such that the moving direction faces upward; and means for instructing to display said first information on said window field and said second information on said base field.

15. A navigation apparatus according to claim 14, wherein said position and moving direction detecting means comprises an azimuth sensor for detecting the moving direction of said vehicle and a distance sensor for measuring a running distance of said vehicle, said position and moving direction detecting means determining the position and moving direction of said vehicle based on a result of detection of said azimuth sensor and a result of measurement of said distance sensor.

16. A navigation apparatus according to claim 14, wherein said position and moving direction detecting means comprises means for receiving positional data provided by an external facility indicative of an absolute coordinates of said vehicle, said position and moving direction means determining the position and moving direction of said moving body based on the positional data received by said receiving means.

17. A navigation apparatus according to claim 14, wherein said position and moving direction detecting means comprises an azimuth sensor for detecting a moving direction of said vehicle and a distance sensor for measuring a running distance of said vehicle, said position and moving direction detecting means determining the position and moving direction of said vehicle through a map matching process between results of detection of said azimuth and distance sensors based on said map information.

18. A navigation apparatus according to claim 14, wherein said predetermined azimuth is the north.

19. A navigation apparatus used in a vehicle for displaying positional information of said vehicle on a display screen, said apparatus comprising:

means for storing map information which covers at least a range of movement of said vehicle;

means for detecting a position and moving direction of said vehicle;

base field display means for extracting first information from said map information based on the position and moving direction of said vehicle detected by said detecting means, and for displaying said first information on the display screen such that a predetermined azimuth of said map information faces upward;

a switch used to instruct a formation of a window field in a part of the screen;

means for instructing a location and size of said window field; and window field display means, when said switch is pressed, for extracting second information from said map information based on the position of said vehicle detected by said detecting means, and for displaying said second information in the instructed location and size on the display screen such that the moving direction faces upward.

20. A navigation apparatus used in a vehicle for displaying positional information of said vehicle on a display screen, said apparatus comprising:

means for storing map information which covers at least a range of movement of said vehicle;

means for detecting a position and moving direction of said vehicle;

base field display means for extracting first information from said map information based on the position and moving direction of said vehicle detected by said detecting means, and for displaying said first information on the display screen such that a predetermined azimuth of said map information faces upward;

a switch used to instruct a formation of a window field in a part of the display screen;

means for instructing a scale factor of an image to be displayed in said window field; and window field display means, when said switch is pressed, for extracting second information from said map information based on the position of said vehicle detected by said detecting means, and for displaying said second information in accordance with the instructed scale factor in said window field such that the moving direction faces upward.

21. A method of displaying a position and moving direction of a vehicle on a display screen of a navigation apparatus which is provided with map information, said method comprising the steps of:

detecting the position and moving direction of said vehicle;

extracting first information from said map information based on the detected position and moving direction of said vehicle, and displaying said first information in a base field of said display screen such that a predetermined azimuth of said map information faces upward; and extracting second information from said map information based on the detected position of said vehicle in response to an operator's instruction as to a formation and a shape of a window field in a part of the display screen, and displaying said second information in said window field such that the moving direction faces upwards.

22. A method according to claim 21 further including a step of marking a current position of said vehicle in said base field.

23. A method according to claim 22, further including a step of indicating the moving direction of said vehicle at the current position in said base field.

24. A method according to claim 21, further including a step of marking the current position of said vehicle in said window field.

25. A method of displaying a position and moving direction of a vehicle on a display screen of a navigation apparatus which is provided with map information, said method comprising the steps of:

detecting the position and moving direction of said vehicle;

extracting first information from said map information based on the detected position and moving direction of said vehicle, and displaying said first information on a base field of said display screen such that a predetermined azimuth of said map information faces upward; and extracting second information from said map information based on the detected position of said vehicle in response to an operator's instruction as to a formation and a location and size of a window field in a part of the display screen, and displaying said second information in said window field such that the moving direction faces upward.

26. A method according to claim 25, further including a step of marking a current position of said vehicle in said base field.

27. A method according to claim 26, further including a step of indicating the moving direction of said vehicle at the current position in said base field.

28. A method according to claim 25, further including a step of marking the current position of said vehicle in said window field.

29. A method of displaying a position and moving direction of a vehicle on a display screen of a navigation apparatus which is provided with map information, said method comprising the steps of:

detecting the position and moving direction of said vehicle;

extracting first information from said map information based on the detected position and moving direction of said vehicle, and displaying said first information on a base field of said display screen such that a predetermined azimuth of said map information faces upward; and extracting second information from said map information based on the detected position of said vehicle in response to an operator's instruction as to a formation and a scale factor of a window field in a part of the display screen, and displaying said second information in said window field such that the moving direction faces upward.

30. A method according to claim 29, further including a step of marking the current position of said vehicle in said window field.

31. A method of displaying a position and moving direction of a vehicle on a display screen of a navigation apparatus which is provided with map information, said method comprising the steps of:

detecting the position and moving direction of said vehicle;

extracting first information from said map information based on the detected position and moving direction of said vehicle, and displaying said first information on a base field of said display screen such that a predetermined azimuth of said map information faces upward; and extracting second information from said information based on the detected position of said vehicle in response to an operator's instruction as to a formation of a window field in part of the display, and displaying said second information in said window field such that the moving direction faces upward; and interchanging said first information and said second information to display said first information on said window field and said second information on said base field.

32. A method according to claim 31, said interchanging step further including a substep of:

detecting the operator's instruction to interchange said first information and said second information.

* * * * *